United States Patent [19]
Kaczur et al.

[11] Patent Number: 4,500,499
[45] Date of Patent: Feb. 19, 1985

[54] PRODUCTION OF HIGH PURITY STABLE FERRATE SALTS

[75] Inventors: Jerry J. Kaczur; John E. Coleman, both of Cleveland, Tenn.

[73] Assignee: Olin Corporation, Cheshire, Conn.

[21] Appl. No.: 500,126

[22] Filed: Jun. 1, 1983

[51] Int. Cl.³ .................. C01G 49/00; C01D 13/00
[52] U.S. Cl. .................. 423/139; 423/157; 423/181; 423/594
[58] Field of Search .......... 423/139, 157, 121, 594

[56] References Cited

U.S. PATENT DOCUMENTS

| | | | |
|---|---|---|---|
| 4,304,760 | 12/1981 | Mein et al. | 423/594 |
| 4,385,045 | 5/1983 | Thompson | 423/594 |
| 4,405,573 | 9/1983 | Deininger et al. | 423/594 |

OTHER PUBLICATIONS

H. J. Hrostowski and A. B. Scott, "The Magnetic Susceptibility of Potassium Ferrate", *The Journal of Chemical Physics*, 18, No. 1, (Jan. 1950), pp. 105–107.
G. W. Thompson, L. T. Ockerman and J. M. Schreyer, "Preparation and Purification of Potassium Ferrate. VI", *J. Amer. Chem. Soc.*, 73, (1951), pp. 1379–1381.
J. M. Schreyer, G. W. Thompson and L. T. Ockerman, "Potassium Ferrate (VI)", *Inorganic Synthesis*, Vol. IV, (1953), pp. 164–168.
H. M. Goff, "An Oxygen-18 Study with $FeO_4^{-2}$", Master's Thesis at the University of Missouri at Columbia, (1971), pp. 20–24.
G. W. Buttwin, "The Identification of the Reaction Products Formed by the Oxidation of Aqueous Ammonia with Potassium Ferrate VI", NTIS Report PB 231 799, Office of Water Resources Research, (1972), pp. 6 and 9–11.
R. Scholder, H. V. Bunsen, F. Kindervater and W. Zeiss, "Concerning Ferrates (VI)", *Z. Anorg. Allg. Chemie*, 282, (1955), pp. 268–279, (Translation from German to English).
R. J. Audette and J. W. Quail, "Potassium, Rubidium, Cesium, and Barrium Ferrates (VI). Preparations, Infrared Spectra, and Magnetic Susceptibilities", *Inorganic Chemistry*, 11, No. 8, (1972), pp. 1904–1908.
H. Burckhardt and K. Lang, "On the Salts of Ferric Acid", *Z. Anorg. Allg. Chemie*, 263, (1950), pp. 169–174, (Translation from German to English).
D. H. Williams and J. T. Riley, "Preparation and Alcohol Oxidation Studies of the Ferrate (VI) Ion, $FeO_4^{2-}$", *Inorganica Chimica. Acta.*, 8, (1974), pp. 177–183.
M. Iino, H. Hiraiwa, Y. Hirose and M. Hirata, "Distribution Profile of an Extractive Distillation Tower", *Journal of Chemical Engineering of Japan*, vol. 4, No. 3, (1971), pp. 231–238, presented at the 35th Annual Meeting of Soc. Chem. Engrs., Japan (1970).

*Primary Examiner*—Herbert T. Carter
*Attorney, Agent, or Firm*—William A. Simons; Thomas P. O'Day

[57] ABSTRACT

An improved process for producing stable, high purity alkali metal or alkaline earth metal ferrate salt products is disclosed. In this process, crude ferrate salts, after being precipitated and separated from a chilled mother liquor, are purified first with a chilled anhydrous, water miscible extraction solvent to remove residual process contaminants therefrom followed by chilled oxidation resistant rinse solvent step, miscible with said extractant, followed by a drying step so as to produce a stable, purified ferrate product which can be safely stored without special provisions. Both batch and continuous modes of operation are disclosed.

19 Claims, 2 Drawing Figures

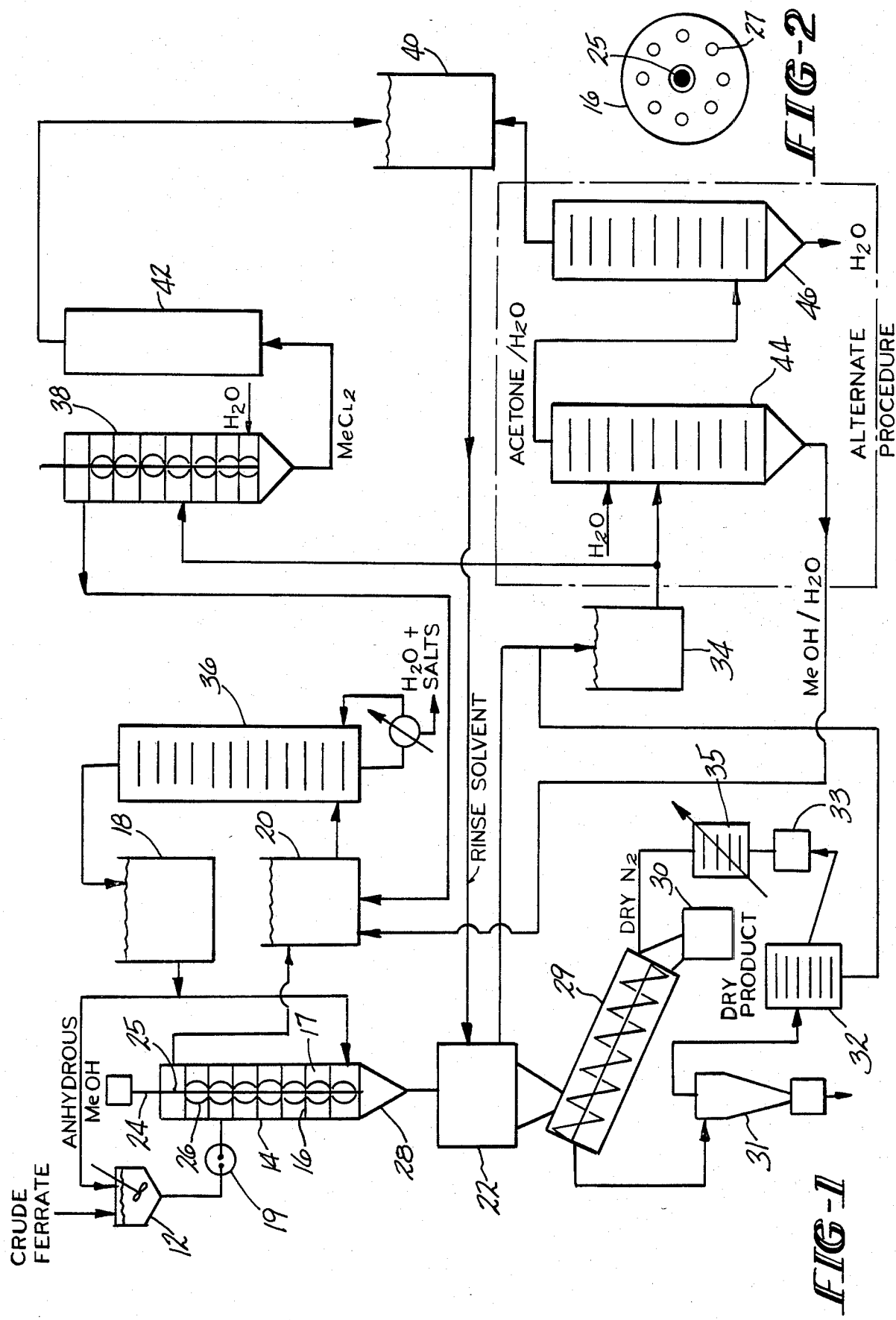

PRODUCTION OF HIGH PURITY STABLE FERRATE SALTS

FIELD OF THE INVENTION

This invention relates to a method for producing stable, high purity alkali metal or alkaline earth metal ferrate salts.

BACKGROUND OF THE INVENTION

The prior art teaches two principle methods for making alkali metal and alkaline earth metal ferrates. One is by the electrolysis of an alkali metal hydroxide anolyte solution in an electrolytic cell having an iron containing anode. The second process involves the reaction of inorganic hypochlorite with iron containing compounds in an aqueous alkaline solution to produce said ferrate. Regardless of which process is used, the product is isolated by precipitation from a chilled alkaline mother liquor. In practice, the salt normally produced, by either method, is sodium ferrate. Where potassium, barium, and other ferrate salts are desired, these are most usually produced from sodium ferrate by methods utilizing secondary precipitation reactions. Techniques for doing this are known in the art.

Where sodium ferrate is produced, the crude salt precipitate normally contains between about 60 and about 80 percent $Na_2FeO_4$, between about 25 and about 10 percent impurities comprising both unconsumed reactants and reaction products such as NaCl, NaOH, $NaClO_3$, NaOCl, and between about 15 and about 10 percent residual water.

However, it is found that sodium ferrate containing such levels of water and other impurities is unstable and tends to degrade very quickly. This lack of stability is primarily due to the reduction of sodium ferrate in the retained water to form ferric hydroxide, sodium hydroxide and oxygen. Further, the rate of decomposition is often accelerated by the residual impurities such as alkali hydroxides or carbonates which either catalyze the degradative reactions and/or absorb additional water from the surrounding atmosphere. Consequently, in preparing a stable purified solid ferrate product, it is necessary that the water and other impurities therein be removed as quickly and completely as possible.

Typically, one or more organic solvents are used to remove the water, excess reactants and reaction products from the crude ferrate product. Solvents useful for this purpose must meet several requirements. For example, they should be capable of extracting and so removing the retained water and other impurities while dissolving relatively little or none of the precipitated ferrate itself. In addition, the solvent must have substantial oxidation resistance so that any small residues left in the ferrate prior to drying will not cause degradation of the product. As a practical matter, no one organic solvent possess all of these properties and it is common to use a combination of solvents, in sequence, to provide all of these capabilities.

For example, Audette and Quail, in "Potassium, Rubidium, Cesium and Barium Ferrates(VI). Preparations, Infrared Spectra, and Magnetic Susceptibilities", *Inorganic Chemistry*, Volume 11, No. 8, pages 1904–1908 (1972), disclose a procedure in which the crude ferrate product was first washed six times with chilled alkali metal hydroxide, with rapid filtration between each wash to prevent product decomposition, three times with dry benzene to remove "excess" water and next three times with absolute methanol. The precipitate was then transferred to a centrifuge wherein it was given an additional 15 to 20 washings with absolute methanol. The methanol wash was followed by five washings with anhydrous ether to remove the methanol.

The vacuum filtered, ether damp product was stored overnight in a vacuum dessicator after which it was given an additional 20 washings with absolute methanol and five more washings with anhydrous ether. Only about a 50 percent yield of 99+ percent $K_2FeO_4$ was obtained, and the product still had to be stored in a vacuum dessicator to avoid slow decomposition due to traces of water and ether still present on the product. Other procedures in the literature replace the benzene and methanol with solvents such as ethanol, isopropanol or secondary butanol.

However, ferrates are very strong oxidizers and can oxidize many organic compounds in the presence of water very easily. For example, in neutral or acidic aqueous solutions, or at mildly elevated temperatures, primary alcohols are quickly oxidized to their corresponding aldehydes and carboxylic acids, secondary alcohols are oxidized to ketones and many ethers are oxidized to extremely hazardous peroxides, all such reactions resulting in severe degradation of the finished product. Thus, as a practical matter, all of these procedures show significant economic, safety or operational deficiencies which act to severely inhibit the ability to make and utilize ferrate materials.

OBJECTS OF THE INVENTION

It is the principle object of the present invention to provide an improved process for removing impurities and water from crude alkali metal and alkaline earth metal ferrate salt products.

It is still a further object of the present invention to produce stable, high purity alkali metal and alkaline earth metal ferrate products which can be stored without special provisions for protecting them from moisture and/or decomposition.

These and other objects of the present invention will become apparent from the following description and the appended claims.

SUMMARY OF THE INVENTION

The above objects are achieved by a process for producing a dry stable alkali metal or alkaline earth metal ferrate salt product from a crude ferrate reaction product containing impurities comprising precipitated process components and residual water, said process comprising:

a. chilling said crude ferrate mixture to between about $-20°$ and about $+20°$ C.;

b. admixing said chilled crude ferrate mixture with a substantially anhydrous water miscible extraction solvent capable of dissolving said impurities at a temperature of between about $-5°$ and about $20°$ C.;

c. separating an intermediate product which is essentially free of said water and said process components from a contaminated extraction solvent containing said impurities;

d. admixing said intermediate product with a substantially anhydrous, oxidation resistant rinse solvent which is miscible with said extraction solvent;

e. washing said extraction solvent from said intermediate product with said rinse solvent to form a combined solvent;

f. separating said rinse solvent from said intermediate product to produce a purified dampened ferrate salt having a combined residue of extraction solvent and rinse solvent; and g. drying said final dampened product to vaporize said combined solvent, thereby producing a purified, stable dry ferrate salt product.

BRIEF DESCRIPTION OF THE DRAWINGS

FIG. 1 is a schematic drawing of a continuous countercurrent water and impurity extraction system as utilized in the present invention.

FIG. 2 is a top plan view of a mixing plate as used in the extraction system of the present invention.

DETAILED DESCRIPTION OF THE INVENTION

The process of the present invention comprises the solvent extraction and rinsing of a precipitated crude ferrate salt produced by the precipitation of a ferrate salt from an alkaline mother liquor resulting from either an electrolytic or hypochlorite based process to remove residual water and impurities mixed therewith.

Such removal, which is accomplished after the salt has been separated from the mother liquor, generally by precipitation from a chilled strongly basic solution begins with the washing of the crude salt with a chilled anhydrous extraction solvent which is both miscible with water and able to dissolve a substantial quantity of the impurities therein. Suitable extraction solvents for this purpose are primary alcohols having from 1 to about 4 carbon atoms and secondary alcohols having between 3 and about 5 carbon atoms, such as methanol, ethanol, propanol, butanol, isopropyl, isobutyl and secondary butyl alcohols, with methanol and ethanol being preferred and methanol being most preferred.

Impurity solubilities for several of the alcohols in this group are given in Table I.

TABLE I

| | Inorganic Solubility* in Anhydrous Alcohols (gm/100 gm of Saturated Solution) | | | |
|---|---|---|---|---|
| Impurity | Methanol | Ethanol | Isopropanol | Sec. Butanol |
| NaOH | 23 | 14.7 | 0.06 | 0.03 |
| KOH | 35.5 | 27.9 | | |
| NaCl | 1.38 | 0.0649 | 0.0027 | 0.00047 |
| KCl | 0.53 | 0.029 | 0.0023 | 0.00084 |
| NaClO$_3$ | 3.07 | | | |
| KClO$_3$ | 0.1 | | | |
| Na$_2$CO$_3$ | 0.31 | | | |
| K$_2$CO$_3$ | 6.17 | | | |

*At ~25° C.

It is found, however, that due to the aforesaid degradative reaction of these alcohols with ferrates at even mildly elevated temperatures, the alcohol wet purified product so prepared cannot be dried under conditions adapted to remove substantially all of the alcohol therefrom without seriously affecting the quality of the finished product. Therefore, the alcohol is removed by a second wash with a rinse solvent which is both alcohol miscible and oxidation resistant so that said purified ferrate product is both essentially free of said alcohol and stable when rinsing is completed.

Suitable rinse solvents have a melting point below about 0° C. and a boiling point in excess of about 5° C. Such solvents include ketones having between 3 and about 5 carbon atoms, such as acetone, methyl, ethyl ketone and diethyl ketone, tertiary alcohols having between 4 and about 6 carbon atoms, such as tertiary butyl, t-methyl butyl, t-ethyl methyl and t-methyl pentyl alcohols, and halogenated aliphatic compounds having between 1 and about 7 carbon atoms, such as methylene chloride, methyl bromide, methylene bromide, trichlorofluoromethane, fluorotribromomethane, dibromochlorofluoromethane, dibromodifluoromethane, bromodichlorofluoromethane, 1,1,1-trichlorotrifluoroethane, 1,1,2-trichloro-1,2,2-trifluoroethane, chloro-1,1,2-trifluoroethane, 1,2-dichloro-1,1-difluoroethane and 1,2-dibromotetrafluoroethane, having a melting point below about 0° C. and a boiling point above about 5° C., with acetone, methylene chloride and 1,1,2-trichloro-1,2,2-trifluoroethane being preferred.

Where quantities of crude product are relatively large, such washing may be conducted immediately on the chilled ferrate. Where it is desired to accumulate such large quantities for more efficient processing from small intermediate quantities of crude product, these can be safely preserved by chilling or even freezing them at temperatures between about −20° and about 0° C. until needed.

Two methods for carrying out the above wash procedure are available—batch and continuous processing.

In batch processing, the crude product, after being precipitated from the chilled mother liquor, is separated from said liquor by vacuum filtration, centrifugation or similar means. Vacuum filtration in a Buchner funnel having a coarse-to-fine pore ceramic or polymeric filter bed being preferred. With such a filter, the wash and filtration operations can be done without substantially displacing the product; that is, when the vacuum is "off", very little, if any, of the liquid in the slurry will pass through the filter so that the ferrate can be slurried in place. With the vacuum "on", the liquid easily passes through the filter while the ferrate crystals remain behind in a readily accessible bed.

The process of purification starts with the slow admixture or slurrying of chilled crude ferrate product into a premeasured amount of a substantially anhydrous, chilled extraction solvent which is at a temperature of between about −5° and about 20° C. Slow addition is preferred so as to more easily control the rate at which the exothermic heat of solution of the product impurities is generated. This is followed by stirring said slurry for sufficient period of time, generally between about 1 and about 15 minutes, to dissolve or extract substantially all of the water and the retained impurities in the crude ferrate, and vacuum filtering or centrifuging the slurry to separate the purified solid ferrate product from the contaminated liquid alcohol wash.

The quantity of extraction solvent required depends on the solubility of the above-listed impurities in the particular alcohol chosen and the amount of residual water which must be removed. As a practical matter, to prevent unwanted ferrate reactions in and with this water, it should be removed as quickly as possible. This is done by keeping the ratio of solvent to water fairly high, i.e. between about 5:1 to about 25:1, and preferably between about 10:1 and about 20:1, particularly at the start of the wash cycle.

For example, with a precipitated potassium ferrate cake containing about 80 percent of a mixed ferrate salt crystalline product analyzing as 3K$_2$FeO$_4$.Na$_2$FeO$_4$, said cake having impurities comprising:

| | |
|---|---|
| NaOH + KOH | 6.0% |
| NaCl + KCl | 0.4% |
| NaClO₃ + KClO₃ | 0.4% |
| NaOCl + KOCl | 1.2% |
| Na₂CO₃ + K₂CO₃ | 0.2% |
| H₂O | 11.8% | a minimum of about 4 pounds of methanol per pound of crude product would be required for product purification based on the solubilities listed in Table I and a 20:1 alcohol/water ratio.

To assure complete removal of these impurities, however, larger quantities of methanol up to about 15 pounds, and preferably between about 5 and about 10 pounds per pound of product, applied over a series of separate wash cycles, are preferably used. When this is done, about ½ to about 1/10 of the total weight, usually between about 2 and about 5 pounds of methanol per pound of crude ferrate product of the methanol is admixed for a first wash with the chilled crude ferrate product for between about 1 and about 5 minutes, and vacuum filtered. This is sufficient to remove substantially all the water and a large percentage of the other impurities.

Further purification is accomplished by reslurrying and filtering the cake 3 or 4 times with between about 0.5 and about 2.0 pounds of methanol per pound of ferrate. By so doing, it is found that chloride, carbonate, hydroxide and hypochlorite have all substantially been removed from the crude mix and the water content has been reduced to less than about 0.5 percent of that originally present on the cake. Multiple washes, by minimizing the quantities of methanol in contact with the ferrate at any one time further, limit the opportunity for uncontrolled decomposition to occur.

The extractant solvent dampened filter cake is next slurried with a chilled rinse solvent in an amount equal to between about 0.5 and 5.0 pounds and preferably between about 1 and 2 pounds per pound of ferrate for between about 1 and about 5 minutes and then filtered. This sequence is repeated until the residual extractant content in the filter cake has been reduced to about 10 percent and preferably to less than about 5 percent of that which was originally present in the final extractant washed cake at which point the ferrate can be safely dried. This normally takes between 2 and 4 such rinses.

At the completion of the rinse cycle, the purified cake is dried, preferably with a flowing gas stream of less than about 0.01% water by weight and at a temperature of between about 20° and about 60° C. With the preferred rinse solvents, it is found that essentially complete removal of methanol is facilitated by the formation of low boiling azeotropes so that it is quickly and completely removed from the surface of the precipitated ferrate product without reaction therewith. Where it is desired to recover the extraction and rinse solvents for reuse, techniques for so doing are described herein below.

Final product purity may range from about 90 to about 99 percent. Further, the product so prepared is quite stable. Samples have been stored for periods as long as a year in closed bottles without the necessity of keeping the product in a vacuum dessicator to protect it from residual traces of water.

Referring to FIG. 1, a second method of the present invention, continuous countercurrent extraction, is shown. This method starts with crude, chilled ferrate salt cake and chilled anhydrous extraction solvent, preferably methanol, being mixed in slurry tank 12 in a ratio of between about 2 to about 4 pounds of methanol per pound of crude ferrate product. The resultant slurry is metered into the countercurrent extraction tower 14 as a downflow therein. Extraction tower 14 contains therein a plurality of vertically stacked horizontally disposed mixing trays 16 placed more or less at regular intervals through the length so as to form a plurality of individual separation stages 17 therein.

Simultaneously, a stream of anhydrous, chilled methanol at a temperature of between about 0° and about 10° C., taken from storage tank 18, is introduced near the bottom of tower 14 so that the ferrate crystals gradually descend through an upwardly flowing stream of methanol. Sufficient methanol is admitted so that the total effective weight of extraction solvent contacted by the descending ferrate crystals is generally within the range specified for batch processing—i.e. between about 4 and about 15 pounds of solvent per pound of crude ferrate mixture. The exact metering rate needed to do this is established by moisture monitor 19 which measures the water content of the slurry and adjusts the metering rate accordingly. By so doing, a high alcohol to water ratio is always assured during this extraction.

Contaminated methanol is removed as an overflow from the top of tower 14 and conveyed to storage tank 20, while a mixture of methanol and purified, water free ferrate product is removed as an underflow from the bottom of the tower 14 and conveyed to centrifuge 22 for final methanol removal and solvent rinsing.

Tower 14 is operated to both minimize loss of fines in the overflow and maximize extraction efficiency to produce water and a impurity free underflow. To do this, the quantities of metered ferrate slurry and upflowing methanol are adjusted to keep the proper weight ratio while avoiding excessive upflow velocities which might sweep product fines into the overflow.

In so doing, tower 14 incorporates a number of special features. Thus, it contains vertically disposed mixer 24 having shaft 25 centrally located therein. Attached to shaft 25 is a plurality of sets of mixing paddles 26, with at least one set being located within each stage 17. FIG. 2 illustrates a preferred design for the individual mixing trays 16 which are flat and perforated with a plurality of holes 27 circularly disposed therein. These are designed to minimize back-mixing from one stage to the one above it by limiting the total drop through space opened by these holes to less than about 10 percent of the plate area. This allows time for efficient removal of the water and other contaminants with minimum upflow velocity of the methanol. Further, with proper paddle design, the downflowing ferrate crystals are effectively kept moving around the tray and more or less continuously cascade through perforations 27 into the next extraction stage and not accumulate to any great extent or for any length of time on a given tray. The efficiency of this countercurrent extraction design utilizing such a procedure is shown in Example 8 herein below.

Solvent rinsing takes place in centrifuge 22 wherein a sufficient quantity, generally in the range of between about 0.5 and about 5.0 pounds per pound of ferrate product, of said rinse solvent is used to reduce the residual methanol in the wet cake to less than about 5 percent of the total residual solvent contained therein. At this level, the wet discharge cake is conveyed to rotary dryer 29 and dried using a warm dehumidified gas such as dry nitrogen or dry air as the drying agent to produce a stable purified dry product which is deposited into storage container 30.

As shown in FIG. 1, the drying gas is passed through cyclone separator 31 to separate out a dust comprised primarily of Fe(OH)$_3$ along with some ferrate fines and then refrigerated in condenser 32 wherein the acetone/methanol mixture removed from the drying cake is recovered. This mixture is conveyed to storage tank 34 wherein it is combined with the solvent recovered from centrifuge 22. The separated drying gas is recycled back to rotary dryer 29 after passing through blower 33 and heater or heat exchanger 35. It should be understood that the use of a centrifuge, rotary dryer and cyclone separator as shown is not critical and that these may be replaced by functionally equivalent processing equipment. Such functionally equivalent units are readily available and widely used in the chemical industry.

Recovery of the methanol from the contaminated extraction solvent from storage tank 20 is achieved by conveying the contaminated extraction solvent to methanol/water fractionation column 36 from which substantially anhydrous methanol (boiling point 64.7° C.) is easily recovered. Unlike ethanol/water mixtures, methanol and water do not form an azeotrope and are easily and completely separated. Since no special provisions need be taken to dry the recovered methanol, the condensed overhead vapor can be returned directly to methanol storage tank 18 for reuse in the system.

A mixture of methanol contaminated with the water and salts remaining in fractionation column 36 is removed as bottoms. This can be redistilled so as to recover the methanol therefrom along with an organic free caustic salt mixture that can be recycled into the basic ferrate process.

Additional quantities of methanol are recovered from the contaminated secondary rinse solvent contained in storage tank 34. However, unlike methanol/water mixtures, mixtures of methanol with all of the preferred secondary solvents form azeotropes, as shown in Table II, so that the straightforward fractional distillation cannot be used.

TABLE II

| Solvent | Methanol/Solvent Azeotropes Weight Percent Methanol |
|---|---|
| Acetone | 12 |
| Methylene Chloride | 7.3 |
| 1,1,2-trichloro-1,2,2-trifluoroethane | 6.3 |

However, where halogenated rinse solvents are used such as methylene chloride or 1,1,2-Trichloro-1,2,2-Trifluoroethane, it is found that liquid/liquid extraction, using water as the extractant, will easily remove methanol therefrom. In FIG. 1, this is done in tower 38 wherein an upwardly flowing quantity of water is admixed with a downwardly flowing column of solvent. Halogenated solvents have almost no miscibility with water and the difference in densities assures that the separation will be quite clean. The water/methanol extraction mix taken from the top of tower 38 is conveyed to storage tank 20 where it is combined with the other recovered methanol/water mixtures for subsequent methanol separation in fractionation column 36.

To remove any small traces of water which may be carried out with the rinse solvent, it can either be stored in storage tank 40 with a dessicant such as silica gel or CaCl$_2$ or, as shown, passed through molecular sieve 42. Either method will yield a substantially anhydrous rinse solvent suitable for reuse in centrifuge 22.

Where acetone is used as the secondary rinse solvent, the readily miscibility of acetone with water makes such liquid/liquid extraction impossible. Rather, other approaches must be used. One method is described by Iino et al. in "Distribution Profile of an Extractive Distillation Tower", *J. Chem. Eng. of Japan,* Volume 4, No. 3, pages 231–238 (1971). As shown in FIG. 1, this involves distilling the solvent mixture in tower 44 into which additional water is introduced as an entrainment agent. This acts to break the azeotrope so a methanol-free acetone/water mixture is recovered from the overhead and an acetone-free methanol/water mixture is recovered from the tower bottom. The acetone (boiling point 56.5° C.) and water are subsequently separated by fractional distillation in tower 46. Since the separated acetone is substantially anhydrous, it can be stored in storage tank 40 until needed for use in centrifuge 22. The methanol/water bottoms are conveyed to storage tank 20 for storage and subsequent methanol recovery.

The following examples are given to illustrate this invention and are not deemed to be limiting thereof. All parts and percentages are by weight unless otherwise specified.

EXAMPLE 1

A total of about 1032 grams of a crude ferrate filter cake of about 80 percent 3K$_2$FeO$_4$/Na$_2$FeO$_4$ purity at a temperature of about −10° C. was slowly stirred into a large beaker containing 4000 milliliters (about 3166 grams) of reagent grade methanol containing −0.1 percent H$_2$O at a starting temperature of about 10° C. With constant stirring, the cake, which contained about 20 percent retained mother liquor containing about 12 percent H$_2$O, 6 percent NaOH, 0.4 percent NaCl, 0.4 percent NaClO$_3$ and about 1.2 percent NaOCl, based on total crude product weight, was added to the solution over a period of about 1 to 2 minutes during which time the temperature of the mixed solution increased to about 13° C. The solution was stirred for an additional 3 minutes and then poured into a 10 inch diameter tabletop Buchner filter with a 35-micron polyethylene frit and vacuum filtered for about 5 minutes.

The vaccum was then released and the cake was reslurried with another 1000 milliliters (about 791 grams) of 20° C. methanol and stirred for about 1 minute. Vacuum was reapplied and the slurry was refiltered for an additional 5 minutes. This reslurry, refilter operation was repeated again with 1000 milliliters of methanol, after which an additional 1000 milliliters of methanol was poured onto the surface of the filtered cake for a final rinse and the vacuum applied again for about 5 minutes to remove excess methanol from the ferrate cake. The total methanol to crude cake weight ratio was 5.46:1 and the residual water in the cake was about 0.5 percent of that originally present.

The damp filter cake was next slurried for about 1 minute with about 1000 milliliters (800 grams) 20° C. reagent grade acetone, having a maximum water content of 0.1 percent H$_2$O, and vacuum refiltered for about 5 minutes after which an additional 1000 milliliters 20° C. reagent grade acetone was then poured onto the filter cake as a final rinse without stirring. The acetone to original crude cake weight ratio was 1.55:1.

Vacuum was then reapplied and the solvent filtered off to produce about 1000 grams of a purified cake retaining about 15 percent solvent by weight, said solvent comprising about 95 percent acetone and about 5 percent methanol. The dampened purified cake was then transferred to a Brinkman Rotovapor Unit which had been modified to handle solids and having a dry air source supply with a dew point of −100° C. The cake was put into a 3-liter evaporator flask with 4 inner indentations to promote solids movement within the flask during rotation. Dry air was applied at a rate of about 15 standard liters per minute at a temperature of 20° C. and the Rotovapor Unit was started rotating at a speed of about 80 rpm. The rotating unit was then tilted into a 40° C. water bath to heat the solid material which was dry after about 20 minutes. Product stability was shown by no exothermic reactions being observed. The final solids weight after drying was 842.2 grams.

The solids were then screened to 60 mesh to remove large clumps of mostly ferric oxide material, with about 2 to 5 grams of solids being lost. The final product had an assay of 93.5 percent $3K_2FeO_4 \cdot Na_2FeO_4$.

EXAMPLE 2

The procedure of Example 1 was followed using about 1420 grams of crude ferrate cake and a methanol:cake weight ratio of about 4.0:1. About 1317 grams of solids were produced with the residual solvent containing about 2 percent methanol.

This was transferred to the Rotovapor Unit and, after rotation was started, the flask was immersed into a 40° C. water bath at which time a vacuum (100 millimeters of Hg) was applied for about 20 minutes with no exothermic reactions being observed. About 1119 grams of dry solids were recovered which, after a 60 mesh screening, yielded about 1116 grams of a stable product having an assay of 94.4 percent $3K_2FeO_4 \cdot Na_2FeO_4$.

EXAMPLE 3

The procedure of Example 1 was followed using 100 grams of a crude ferrate cake which had been chilled to a temperature of −5° C. This was slowly mixed with 450 milliliters of anhydrous methanol at a temperature of about 5° C. Mixing continued for about 5 minutes and the resultant slurry was vacuum filtered onto a coarse frit glass filter disc. The filtered solids were then twice reslurried with about 100 milliliters of substantially anhydrous methanol at a temperature of about 15° C. and re-vacuum filtered. The solvent wet ferrate cake from the second refiltration was then divided into two, approximately equal lots.

About 45 grams of methanol solvent wet ferrate cake, as prepared above, was placed on a medium frit glass filter and reslurried with about 25 milliliters of essentially anhydrous methylene chloride for about 2 minutes and refiltered. This was reslurried with an additional 25 milliliters of methylene chloride and refiltered. A slight yellow discoloration was noted in the filtrate. About 42.8 grams of the methylene chloride solvent wet solids were removed from the filter and placed in a 250-milliliter filtered flask. This was placed in a water bath at about 43° C. and a vacuum of about 25 inches was applied to the flask until the solids were dry. About 38.19 grams of purified ferrate, assaying about 92.2 percent purity, was obtained.

EXAMPLE 4

The remaining portion of methanol solvent wet ferrate cake, as prepared in Example 3 above, was placed on a medium frit glass filter as described above. This was slurried with about 42.5 milliliters of reagent grade methyl ethyl ketone having a water content of <0.3 percent for about 2 minutes and vacuum filtered. The cake was then reslurried with a second portion of about 42.5 milliliters of methyl ethyl ketone for about 2 minutes and refiltered. A very slightly yellow discoloration was noted in the filtrate.

About 46.27 grams of methyl ethyl ketone solvent wet solids were removed from the filter and placed in a 250-milliliter filtering flask which was heated to about 43° C. in a water bath while about a 26-inch vacuum was applied to the flask with no exotherm or other adverse reaction was exhibited. About 42.93 grams of solids having a ferrate assay of 93.7 percent was recovered.

EXAMPLE 5

About 45 grams of a methanol solvent wet ferrate cake, as prepared in Example 3 above, was placed on a medium frit glass filter and slurried with about 50 milliliters of a technical grade 1,1,1-trichloroethane rinse solvent having a purity of about 97 percent, about 3 percent t-dioxane stabilizer and about 0.25 percent secondary butanol at a temperature of about 10° C. The slurry was mixed for about 2 minutes and vacuum filtered with the filtered cake being reslurried with an additional 50 milliliters of trichloroethylene for about 2 minutes and refiltered. The filtrate exhibited a very slight yellow color.

About 49.14 grams of trichloroethylene solvent wet solids were removed. This was placed in a 250-milliliter filtered flask as described above and heated under 26 inches of vacuum at a temperature of 43° C. A very slight outgassing was noted but no visible temperature rise occurred. It is postulated that the outgassing was due to the presence of the stabilizer in the trichloroethylene. A final weight of about 39.80 grams of purified dry ferrate having an assay of about 92.7 percent was obtained.

EXAMPLE 6

The procedure of Example 5 was repeated using about 42.5 milliliters of 1,1,2-trichloro-1,2,2-trifluoroethane having an assay of 99+ percent for each of the solvent rinses. A slight yellow color was noted in the vacuum filtrate.

About 43.44 grams of solvent wet cake was recovered which, after vacuum drying, yielded about 38.24 grams of material having a 94.6 percent assay. No exotherm was observed during drying.

EXAMPLE 7

The procedure of Example 5 was repeated with 49.4 grams of methanol solvent cake and about 42.5 milliliters of tertiary butyl alcohol (boiling point 81.5°–83° C., Mallinkrodt AR Grade) being used for the two solvent rinses.

About 48.28 grams of solvent wet cake was recovered which, after vacuum drying, yielded about 41.50 grams of material having an assay of 93.7 percent. Both filtrates were clear and no exotherm was observed. A slight outgassing was observed during final drying.

EXAMPLE 8

An engineering countercurrent extraction design test unit utilizing about a 30 inch long, 3 inch diameter tower having six extraction stages was assembled. The first extraction stage was about 9 inches long at the upper end of which the overflow was removed. The next four stages were each about 3 inches long and the last stage was a combination of the methanol inlet and bottom settling zone 28 within tower 14 from which the underflow was removed. Stage 1 contained two sets of paddles 26, while Stages 2-5 contained one set, each paddle being about 2 inches long and about ½ inch wide.

When a 50 percent slurry of a water containing a soluble dye and sand was introduced into the top of a 3 inch diameter having a water upflow rate of about 650 milliliters per minute, it was found that the dye did not penetrate below the top three extraction stages and that none was detectable in the bottom three stages. Further, the sand, which was chosen to have a particle size roughly equivalent to that of the ferrate crystals in crude mixture, easily dropped through perforations in the mixing trays from one stage to the next. In so doing, the largest particles took about 20 seconds to reach the bottom of the tower while the finest particles took about 240 seconds. No sand particles were found in the overflow.

COMPARATIVE EXAMPLE A

The procedure of Example 1 was followed, using about 908 grams of crude filter cake, with the exception that the final rinse was with a reagent grade methanol having <0.01 percent $H_2O$ (methanol:cake weight ratio of 6.2:1) and with the acetone solvent rinses being omitted. About 975 grams of methanol solvent-wet ferrate cake having a residual water content of about 0.1 percent of that originally present were produced.

This was transferred to the Brinkman Rotovapor Unit and dried at 45° C. under vacuum as described under Example 2. Near the end of the vacuum drying, an exothermic reaction was observed which caused the solids temperature to increase to about 90° C. Ferric hydroxide decomposition products could be seen on the flask sides and in the solids. The final weight of the solids before removal from the flask was about 801 grams with 633 grams of solids having an assay of about 86 percent $3K_2FeO_4.Na_2FeO_4$ being recovered.

This shows that even in the substantial absence of water, ferrate salts are unstable in the presence of oxidizable organic solvents, such instability not being shown by the products of the present invention.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A process for producing stable, high purity alkali metal or alkaline earth metal ferrate salts from a crude ferrate reaction mixture containing impurities comprising precipitated process components and residual water, said process comprising:
   a. chilling said crude ferrate mixture to between about −20° and about +20° C.;
   b. admixing said chilled crude ferrate mixture into a substantially anhydrous water miscible extraction solvent capable of dissolving said impurities at a temperature of between about −5° and about 20° C., said extraction solvent selected from the group consisting of primary alcohols having from 1 to about 4 carbon atoms and secondary alcohols having from 3 to about 5 carbon atoms;
   c. separating an intermediate product which is essentially free of said water and said process components from a contaminated extraction solvent containing said impurities;
   d. admixing said intermediate product with a substantially anhydrous, oxidation resistant rinse solvent which is miscible with said extraction solvent, said rinse solvents selected from the group consisting of ketones having from 3 to about 5 carbon atoms, tertiary alcohols having from 4 to about 6 carbon atoms, and halogenated aliphatic compounds having from 1 to about 7 carbon atoms;
   e. washing said extraction solvent from said intermediate product with said rinse solvent to form a combined solvent;
   f. separating said rinse solvent from said intemediate product to produce a purified dampened ferrate salt having a residue of combined extraction solvent and rinse solvent; and
   g. drying said final dampened product in a warm dehumidified gas to vaporize said combined solvent, thereby producing a purified, stable, dry ferrate salt product.

2. The process of claim 1 wherein said extraction solvent is methanol.

3. The process of claim 2 wherein step b. further comprises the steps of:
   (1) slurrying said crude ferrate mixture into an amount of substantially anhydrous methanol equal to between about 2 and about 5 pounds per pound of said crude ferrate mixture for between about 1 and about 5 minutes;
   (2) filtering said slurry;
   (3) repeating step (1) with an amount of methanol equal to between about 0.5 and about 2.0 pounds of methanol per pound of crude ferrate mixture;
   (4) filtering said slurry to form a dampened filter cake; and
   (5) repeating steps (3) and (4) until said crude ferrate reaction mixture is substantially water and impurity free.

4. The process of claim 2 wherein the methanol is added in an amount equal to between about 4 and about 15 pounds per pound of crude ferrate salt being washed.

5. The process of claim 4 wherein the methanol is added in an amount equal to between about 5 and about 10 pounds per pound of the crude ferrate salt being washed.

6. The process of claim 1 wherein the admixing of step b. is carried out for a period of between about 1 and about 15 minutes.

7. The process of claim 1 wherein said rinse solvent is acetone.

8. The process of claim 1 wherein said rinse solvent is methylene chloride.

9. The process of claim 1 wherein said rinse solvent is 1,1,2-trichloro-1,2,2-trifluoroethane.

10. The process of claim 1 wherein said rinse solvent is added in an amount equal to between about 0.5 and about 5.0 pounds per pound of said intermediate product.

11. The process of claim 10 wherein said rinse solvent is added in an amount equal to between about 1 and about 2 pounds per pound of said intermediate product.

12. The process of claim 1 wherein step b. further comprises:

(1) admixing said crude ferrate mixture with an amount of said extraction solvent to form a slurry;

(2) metering said slurry into the top of a countercurrent extraction system to form a downflow therein;

(3) contacting said metered slurry with an upflowing amount of said extraction solvent at a rate adapted to dissolve and extract substantially all of said water and process components; and (4) removing the contaminated solvent as an overflow from said extraction system and a purified ferrate salt as an underflow from said extraction system.

13. The process of claim 1 further comprising the step of fractionating said contaminated extraction solvent to recover an overhead of purified extraction solvent and a bottoms comprised of extraction solvent contaminated with water and process components.

14. The process of claim 13 further comprising distilling said bottoms to separate said extraction solvent from said process components.

15. The process of claim 1 further comprising the step of fractionating said combined solvent to separate said rinse solvent and said extraction solvent for reuse.

16. The process of claim 15 wherein said fractionation comprises liquid/liquid extraction.

17. The process of claim 16 wherein said liquid/liquid extraction uses water as an extractant.

18. The process of claim 15 wherein said fractionation comprises fractional distillation.

19. A process for producing purified dry stable alkali metal or alkaline earth metal ferrate salts from a crude ferrate reaction mixture containing impurities comprising precipitated process components and residual water, said process comprising:

a. chilling said crude ferrate mixture to between about $-20°$ and about $+20°$ C.;

b. admixing said chilled crude ferrate mixture with a substantially anhydrous methanol to dissolve said impurities at a temperature of between about $-5°$ and about 20° C., said methanol being added in an amount equal to about 4 and about 15 pounds per pound of crude ferrate mixture for between about 1 and about 15 minutes;

c. separating an intermediate product which is essentially free of said water and said process components from a contaminated extraction solvent containing said impurities;

d. admixing said intermediate product with a substantially anhydrous acetone as a rinse solvent, said acetone being added in an amount equal to between about 0.5 and about 5.0 pounds per pound of intermediate product;

e. washing said extraction solvent from said intermediate product with said rinse solvent to form a combined solvent;

f. separating said rinse solvent from said intermediate product to produce a purified dampened ferrate salt having a residue of combined extraction solvent and rinse solvent; and g. drying said final dampened product in a warm dehumidified gas to vaporize said combined solvent, thereby producing a purified, stable, dry ferrate salt product.

* * * * *